United States Patent
Ye et al.

(10) Patent No.: US 9,698,988 B2
(45) Date of Patent: Jul. 4, 2017

(54) MANAGEMENT CONTROL METHOD, APPARATUS, AND SYSTEM FOR VIRTUAL MACHINE

(71) Applicant: Huawei Technologies Co., Ltd., Shenzhen (CN)

(72) Inventors: Sihai Ye, Shenzhen (CN); Xun Shi, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 158 days.

(21) Appl. No.: 14/720,245

(22) Filed: May 22, 2015

(65) Prior Publication Data

US 2015/0256341 A1 Sep. 10, 2015

Related U.S. Application Data (63) Continuation of application No. PCT/CN2012/085008, filed on Nov. 22, 2012.

(51) Int. Cl.
*H04L 9/32* (2006.01)
*H04L 12/24* (2006.01)
(Continued)

(52) U.S. Cl.
CPC .......... *H04L 9/321* (2013.01); *G06F 9/45533* (2013.01); *G06F 21/31* (2013.01);
(Continued)

(58) Field of Classification Search
None
See application file for complete search history.

(56) References Cited

U.S. PATENT DOCUMENTS

| 7,996,685 B2 * | 8/2011 | Jin | G06F 21/14 713/187 |
|---|---|---|---|
| 2002/0120876 A1 * | 8/2002 | Pearson | G06F 21/34 726/15 |

(Continued)

FOREIGN PATENT DOCUMENTS

| CN | 1997955 A | 7/2007 |
|---|---|---|
| CN | 101188624 A | 5/2008 |

(Continued)

OTHER PUBLICATIONS

Yu-Qiong, S., et al., "Dual AIK Signing Mechanism on Trusted Virtualization Platform," Computer Engineering, vol. 37, No. 16, Aug. 2011, pp. 114-116.

(Continued)

*Primary Examiner* — William Goodchild
(74) *Attorney, Agent, or Firm* — Kilpatrick Townsend & Stockton LLP (57) ABSTRACT

A security control platform receives a virtual machine starting request message that is from user equipment and forwarded by a management platform, where the virtual machine starting request message includes an identifier of a virtual machine that needs to be enabled and user information; invokes a third-party trusted platform to determine that the virtual machine starting request message is initiated by the user equipment according to an instruction of an authorized user; and performs authentication on the user information, and based on successful authentication, invokes the third-party trusted platform to decapsulate the virtual machine that needs to be enabled. It is ensured that other user equipment (including the management platform) cannot obtain a key of the third-party trusted platform, which enhances security of management control on the virtual (Continued)

machine, and thereby enhances security of a cloud computing platform.

13 Claims, 4 Drawing Sheets

(51) Int. Cl.
    *G06F 9/455* (2006.01)
    *G06F 21/31* (2013.01)
    *H04L 9/30* (2006.01)
    *H04L 29/06* (2006.01)

(52) U.S. Cl.
    CPC ............... *H04L 9/30* (2013.01); *H04L 12/24* (2013.01); *H04L 41/0803* (2013.01); *H04L 63/0442* (2013.01)

(56) References Cited

U.S. PATENT DOCUMENTS

| | | | |
|---|---|---|---|
| 2003/0041255 A1* | 2/2003 | Chen | G06F 21/54 713/193 |
| 2006/0020781 A1 | 1/2006 | Scarlata et al. | |
| 2006/0288238 A1* | 12/2006 | Ray | G06F 21/10 713/193 |
| 2009/0172328 A1* | 7/2009 | Sahita | G06F 12/1491 711/163 |
| 2011/0099367 A1* | 4/2011 | Thom | H04L 9/0877 713/156 |
| 2011/0302415 A1 | 12/2011 | Ahmad et al. | |
| 2013/0227296 A1 | 8/2013 | Lee et al. | |

FOREIGN PATENT DOCUMENTS

| | | |
|---|---|---|
| CN | 101533434 A | 9/2009 |
| CN | 102202046 A | 9/2011 |
| CN | 102291452 A | 12/2011 |
| JP | 20050208999 A | 8/2005 |
| JP | 2008176506 A | 7/2008 |
| JP | 2012198631 A | 10/2012 |
| JP | 20130176038 A | 9/2013 |
| WO | 2005096121 A1 | 10/2005 |
| WO | 2011116459 A1 | 9/2011 |
| WO | 2011141579 A2 | 11/2011 |
| WO | 2012148324 A1 | 11/2012 |

OTHER PUBLICATIONS

Foreign Communication From a Counterpart Application, Chinese Application No. 201280003455.8, Chinese Office Action dated Mar. 17, 2016, 5 pages.
Partial English Translation and Abstract of Japanese Patent Application No. JPA2005208999, Jul. 28, 2016, 52 pages.
Partial English Translation and Abstract of Japanese Patent Application No. JPA2008176506, Jul. 28. 2016, 57 pages.
Partial English Translation and Abstract of Japanese Patent Application No. JPA2013176038, Jul. 28, 2016, 17 pages.
Foreign Communication From a Counterpart Application, Japanese Application No. 2015-543228, English Translation of Japanese Notice of Rejection dated Jun. 21, 2016, 4 pages.
Foreign Communication From a Counterpart Application, European Application No. 12888666.0, Extended European Search Report dated Oct. 2, 2015, 7 pages.
Foreign Communication From a Counterpart Application, PCT Application No. PCT/CN2012/085008, English Translation of International Search Report dated Aug. 22, 2013, 2 pages.
Foreign Communication From a Counterpart Application, PCT Application No. PCT/CN2012/085008, English Translation of Written Opinion dated Aug. 22, 2013, 7 pages.

* cited by examiner

MANAGEMENT CONTROL METHOD, APPARATUS, AND SYSTEM FOR VIRTUAL MACHINE

CROSS-REFERENCE

This application is a continuation of International Application No. PCT/CN2012/085008, filed on Nov. 22, 2012, which is hereby incorporated by reference in its entirety.

TECHNICAL FIELD

The present invention relates to communications technologies, and in particular, to a management control method, apparatus, and system for a virtual machine.

BACKGROUND

By effectively integrating various interconnected computing resources and implementing multi-layer virtualization and abstraction, a cloud computing platform can effectively provide massive computing resources for users in a form of a reliable virtual machine. The cloud computing platform must not only provide a reliable security assurance technology to prevent security attacks from the Internet and between virtual machines, but also ensure credibility of the cloud computing platform and various applications of the users so as to prevent leakage of user privacy data that includes a trade secret, leakage of code, and so on.

The security assurance technology provided by an existing cloud computing platform includes, for example, a virtual machine user identity authentication technology, or a malware prevention technology, or a data leakage prevention (DLP) technology.

However, the security assurance technology provided based on the existing cloud computing platform has a lot of problems. For example, the virtual machine user identity authentication technology cannot solve a security threat problem caused by a privilege of a cloud computing platform administrator; for another example, the malware prevention technology can prevent only malware and Trojan horses that can be identified by security software and a false negative may occur; for another example, the data leakage prevention technology supports only limited operating systems or applications and cannot support 64-bit Windows, Linux, and the like, or does not apply to a scenario of multiple tenants in a cloud and cannot control data transmission leakage between virtual machines, or is not transparent to users, which affects information sharing efficiency in an enterprise.

Therefore, the security assurance technology provided by the existing cloud computing platform has a problem of relatively low security.

SUMMARY

The present invention provides a management control method, apparatus, and system for a virtual machine, which can alleviate a problem of relatively low security that exists in a security assurance technology provided by an existing cloud computing platform.

According to a first aspect, the present invention provides a management control method for a virtual machine, including: receiving, by a security control platform, a virtual machine starting request message that is from user equipment and forwarded by a management platform, where the virtual machine starting request message includes an identifier of a virtual machine that needs to be enabled and user information; invoking a third-party trusted platform to determine that the virtual machine starting request message is initiated by the user equipment according to an instruction of an authorized user; and performing authentication on the user information, and based on successful authentication, invoking the third-party trusted platform to decapsulate the virtual machine that needs to be enabled.

Based on the first aspect, in a first possible implementation manner, the invoking a third-party trusted platform to determine that the virtual machine starting request message is initiated by the user equipment according to an instruction of an authorized user includes, if it is determined that the virtual machine starting request message is encrypted using a key provided by the third-party trusted platform for the authorized user, determining that the virtual machine starting request message is initiated by the user equipment according to the instruction of the authorized user, and invoking the key provided by the third-party trusted platform for the authorized user, to decrypt the virtual machine starting request message.

Based on the first aspect, in a second possible implementation manner, the invoking a third-party trusted platform to determine that the virtual machine starting request message is initiated by the user equipment according to an instruction of an authorized user includes, if it is determined that the virtual machine starting request message is encrypted using a public key of the third-party trusted platform, invoking the public key of the third-party trusted platform to decrypt the virtual machine starting request message; and obtaining digital signature information of the virtual machine starting request message, and if it is determined that the obtained digital signature information is consistent with digital signature information of the authorized user stored in advance on the security control platform, determining that the virtual machine starting request message is initiated by the user equipment according to the instruction of the authorized user.

Based on the first aspect, in a third possible implementation manner, the invoking a third-party trusted platform to determine that the virtual machine starting request message is initiated by the user equipment according to an instruction of an authorized user includes: invoking, by the security control platform, the third-party trusted platform to generate data encrypted using a key of the third-party trusted platform; sending the encrypted data to the user equipment using the management platform so that the user equipment decrypts the encrypted data using a private key provided by the third-party trusted platform for the authorized user, and returns decrypted data to the security control platform; and if it is determined that the decrypted data is the same as the encrypted data, determining that the virtual machine starting request message is initiated by the user equipment according to the instruction of the authorized user.

Based on the first, second, and third possible implementation manners of the first aspect, in a fourth possible implementation manner, after the invoking the third-party trusted platform to decapsulate the virtual machine that needs to be enabled, the method includes: invoking, by the security control platform, the third-party trusted platform to perform an integrity check on the virtual machine; and if an integrity check value is inconsistent with an integrity check value, of the virtual machine, stored on the security control platform, restricting enabling of the virtual machine; or if an integrity check value is consistent with an integrity check value, of the virtual machine, stored on the security control platform, enabling the virtual machine.

Based on the first, second, and third possible implementation manners of the first aspect, in a fifth possible implementation manner, after the invoking the third-party trusted platform to decapsulate the virtual machine that needs to be enabled, the method includes detecting, by the security control platform using a virtual machine monitor, that a new application program is installed in the virtual machine; determining that the new application program is installed by the user equipment according to an instruction of the authorized user; and invoking the third-party trusted platform to perform an integrity check on the virtual machine, and updating an integrity check value, of the virtual machine, stored on the security control platform.

Based on the first, second, and third possible implementation manners of the first aspect, in a sixth possible implementation manner, after the invoking the third-party trusted platform to decapsulate the virtual machine that needs to be enabled, the method includes receiving, by the security control platform, a virtual machine integrity check request message sent by the management platform, where the virtual machine integrity check request message is sent by the user equipment to the management platform, and the virtual machine integrity check request message includes an identifier of a virtual machine that requires an integrity check; invoking the third-party trusted platform to perform an integrity check on the virtual machine; comparing an integrity check value with an integrity check value, of the virtual machine, stored on the security control platform; and sending an integrity check value comparison result to the management platform so that the management platform sends the integrity check value comparison result to the user equipment.

Based on the first, second, and third possible implementation manners of the first aspect, in a seventh possible implementation manner, after the invoking the third-party trusted platform to decapsulate the virtual machine that needs to be enabled, the method includes: detecting, by the security control platform using a virtual machine monitor, an access request of one or more other virtual machines for virtual storage data in the virtual machine, and obtaining an identifier of the one or more other virtual machines that initiate the access request and an identifier of an application program; if it is determined that an access control policy table entry of the virtual machine includes the identifier of the one or more other virtual machines and the identifier of the application program that are obtained, invoking the third-party trusted platform to decrypt the virtual storage data in the virtual machine; and sending decrypted virtual storage data to the one or more other virtual machines that initiate the access request.

Based on the first aspect, in an eighth possible implementation manner, the virtual machine starting request message further includes an encapsulation key for the virtual machine that needs to be enabled; and after the performing authentication on the user information, based on successful authentication, the method includes decapsulating, by the security control platform, the virtual machine corresponding to the identifier of the virtual machine using the encapsulation key, which is included in the virtual machine starting request message, for the virtual machine that needs to be enabled.

The security control platform includes a trusted service domain (TSD), and the third-party trusted platform includes a trusted platform module (TPM) and a trusted cryptography module (TCM).

According to a second aspect, the present invention provides a security control platform, including: a receiving module, configured to receive a virtual machine starting request message that is from user equipment and forwarded by a management platform, where the virtual machine starting request message includes an identifier of a virtual machine that needs to be enabled and user information; a determining module, configured to, on the basis that the receiving module receives the virtual machine starting request message that is from the user equipment, invoke a third-party trusted platform to determine that the virtual machine starting request message is initiated by the user equipment according to an instruction of an authorized user; and a decapsulating module, configured to, on the basis that the determining module determines that the virtual machine starting request message is initiated by the user equipment according to the instruction of the authorized user, after the user information is authenticated successfully, invoke the third-party trusted platform to decapsulate the virtual machine that needs to be enabled.

According to a third aspect, the present invention provides a management control system for a virtual machine, including the foregoing security control platform.

According to a fourth aspect, the present invention provides a security control platform, including a processor, where the processor performs the following steps during running: receiving a virtual machine starting request message that is from user equipment and forwarded by a management platform, where the virtual machine starting request message includes an identifier of a virtual machine that needs to be enabled and user information; invoking a third-party trusted platform to determine that the virtual machine starting request message is initiated by the user equipment according to an instruction of an authorized user; and after the user information is authenticated successfully, invoking the third-party trusted platform to decapsulate the virtual machine that needs to be enabled.

It can be known from the foregoing technical solutions that, in embodiments of the present invention, when receiving a virtual machine enabling request message that is encrypted using a key of a third-party trusted platform, is from user equipment, and is forwarded by a management platform, a security control platform first invokes a decryption function of the third-party trusted platform to decrypt the virtual machine enabling request message, obtains user information and an identifier of a virtual machine that needs to be enabled, which are included in the virtual machine enabling request message, further performs authentication on the user information, and then after successful authentication, invokes the decryption function of the third-party trusted platform again to decapsulate the virtual machine that needs to be enabled, thereby ensuring that other user equipment (including the management platform) can neither obtain the key, of the third-party trusted platform, for encrypting the virtual machine enabling request message, nor obtain an encapsulation key, of the third-party trusted platform, for performing encapsulation and encryption on the virtual machine. That is, the virtual machine of a user can be enabled only by the user, which enhances security of management control on the virtual machine, and thereby also enhances security of a cloud computing platform.

BRIEF DESCRIPTION OF DRAWINGS

To describe the technical solutions in the embodiments of the present invention more clearly, the following briefly introduces the accompanying drawings needed for describing the embodiments. The accompanying drawings in the following description show some embodiments of the present invention.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. The described embodiments are some but not all of the embodiments of the present invention.

In the embodiments of the present invention, a security control platform includes a trusted service domain (TSD); the security control platform is a module that provides a trusted security service, and a deployment form of the security control platform may be a software module, or a physical host, or a virtual machine, which is not limited in the present invention. The security control platform is configured to, when user equipment starts a protected virtual machine of a user, invoke a third-party trusted platform to complete authentication performed on user information, and prevent unauthorized users (including an administrator) from starting the protected virtual machine of the user. The security control platform is further configured to preset a security control policy table of the protected virtual machine so as to authorize application programs that can be installed in the protected virtual machine. The security control platform is further configured to preset an access control policy table of the protected virtual machine so as to authorize other virtual machines and their application programs that can access virtual storage data in the protected virtual machine.

In the embodiments of the present invention, the third-party trusted platform includes a trusted platform module (TPM) or a trusted cryptography module (TCM), and a deployment form of the third-party trusted platform may be a hardware chip installed on a server mainboard of a cloud computing platform. The third-party trusted platform is an embedded computing system features security and confidentiality functions, and has anti-attack, anti-tampering, and anti-detection capabilities in a physical security aspect; therefore, the third-party trusted platform can ensure that the third-party trusted platform and data on the cloud computing platform are protected from an illegal attack, and provide a basic root of trust and security function support for the cloud computing platform.

Figure 1:
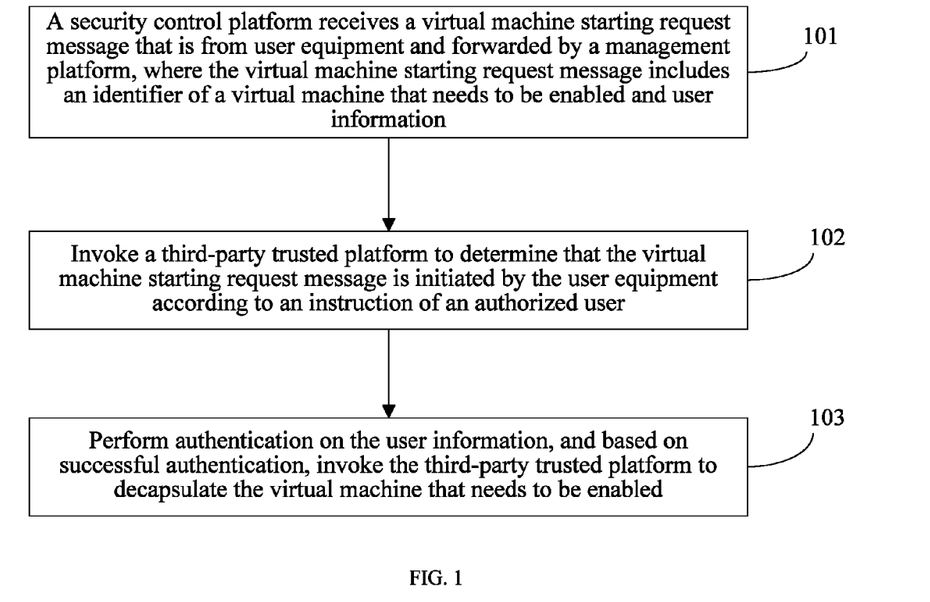
FIG. 1 is a schematic flowchart of a management control method for a virtual machine according to an embodiment of the present invention.

FIG. 1 is a schematic flowchart of a management control method for a virtual machine according to an embodiment of the present invention, and as shown in FIG. 1, the management control method for a virtual machine in this embodiment may include:

101: A security control platform receives a virtual machine starting request message that is from user equipment and forwarded by a management platform, where the virtual machine starting request message includes an identifier of a virtual machine that needs to be enabled and user information.

Figure 2:
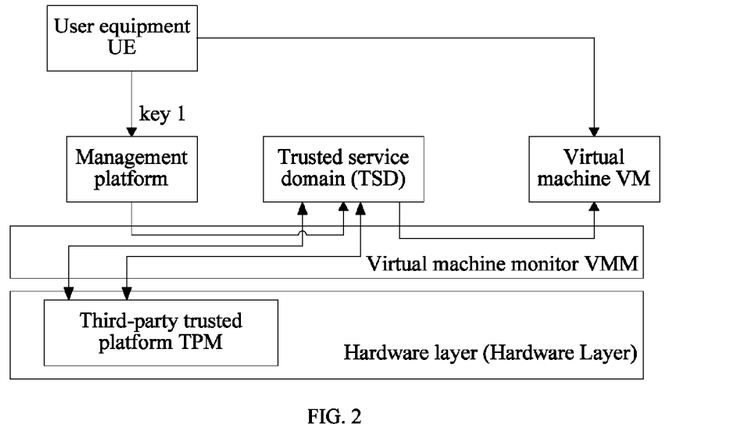
FIG. 2 is an architecture diagram of an application system of the embodiment of the management control method for a virtual machine shown in FIG. 1 is applied.

FIG. 2 is an architecture diagram of an application system of the management control method for a virtual machine shown in this embodiment of the present invention, and as shown in FIG. 2, various components of the application system shown in FIG. 2 are described in the following:

A hardware layer may be a physical host that includes a central processing unit (CPU), a memory, and a network resource, where the physical host has a TPM chip, and the physical host that includes the TPM chip constitutes the third-party trusted platform in this embodiment of the present invention.

A virtual machine monitor (VMM) is located between the hardware layer and an operating system, is responsible for providing a virtualized hardware resource for the operating system that runs at an upper layer, manages and allocates the virtualized hardware resource, and ensures that virtual machines at the upper layer are isolated from each other.

A management platform (Manage Domain) is a manager and controller of other virtual machines. It is a privileged virtual machine, has a privilege to operate an input/output resource, can directly access physical hardware, and is responsible for receiving a management instruction of a management system and interacting with an application programming interface (API) provided by the virtual machine monitor, to implement management of other user virtual machines (VMs).

A TSD is the security control platform in this embodiment of the present invention.

The VM is a protected unprivileged virtual machine provided for an authorized user, runs a client operating system, and is a private security container or trusted space for the user.

User equipment (UE) may be any terminal device that connects to a cloud computing platform to access the virtual machine of the authorized user.

Based on the system shown in FIG. 2, if the authorized user wants to enable the protected VM of the authorized user using the user equipment, the user equipment sends a virtual machine starting request message to the management platform, where the virtual machine starting request message includes user information and an identifier (ID) of the virtual machine that needs to be enabled. The user information includes but is not limited to information about the user equipment such as an ID, a user account, a password, and a dynamic password.

In an optional implementation manner of the present invention, to ensure that enabling of the virtual machine is secure and trustworthy, the foregoing virtual machine starting request message may be encrypted using a key of the third-party trusted platform, such as a key1 shown in FIG. 2, which is the key of the third-party trusted platform. The key of the third-party trusted platform may be a private Universal Serial Bus (USB) key or a smart card provided by the third-party trusted platform for the user. Only the authorized user can use the private key to encrypt the virtual machine starting request message, and neither the management platform nor other users can use the key.

In an optional implementation manner of the present invention, to ensure that enabling of the virtual machine is secure and trustworthy, the user equipment may add a digital signature to the virtual machine starting request message according to a key that is set using an instruction of the authorized user, and then encrypt the virtual machine starting request message using a public key of the third-party trusted platform.

As shown in FIG. 2, after the management platform receives the virtual machine starting request message sent by the user equipment, the management platform identifies whether the user equipment that sends the virtual machine starting request message is a user that subscribes to a trusted service, and if yes, the virtual machine starting request message is sent to the security control platform. The virtual machine starting request message is encrypted using the key of the third-party trusted platform, and the management platform cannot obtain the key of the third-party trusted platform, which can ensure that enabling of the virtual machine is secure and trustworthy, and solve a security threat problem caused by a privilege of a cloud computing platform administrator.

102: Invoke a third-party trusted platform to determine that the virtual machine starting request message is initiated by the user equipment according to an instruction of an authorized user.

In an optional implementation manner of the present invention, the virtual machine starting request message sent by the user equipment to the security control platform using the management platform may not be encrypted. To ensure that enabling of the virtual machine is secure and trustworthy, the security control platform may invoke an encryption function of the third-party trusted platform, to generate a piece of data encrypted using a key of the third-party trusted platform. The security control platform sends the encrypted data to the user equipment using the management platform. The user equipment decrypts the encrypted data using a private key (for example, a USB Key or a smart card) provided by the third-party trusted platform for the user, and sends decrypted data to the security control platform. The security control platform makes a comparison and determines whether the decrypted data is the same as the encrypted data, and if the decrypted data is the same as the encrypted data, determines that the virtual machine starting request message is started by the authorized user. The private USB Key or the smart card can be used only by the authorized user, and neither the management platform nor other users can obtain the private USB Key or the smart card of the authorized user, which ensures that enabling of the virtual machine is secure and trustworthy.

In an optional implementation manner of the present invention, if in step 101, the foregoing virtual machine starting request message is encrypted by the user equipment using the private key provided by the third-party trusted platform for the user, the security control platform invokes a decryption function of the third-party trusted platform to decrypt the virtual machine starting request message, in other words, to decrypt the virtual machine starting request message using the private key provided by the third-party trusted platform for the user. After the decryption, the security control platform may obtain the user information and the identifier of the virtual machine that needs to be enabled, which are included in the virtual machine starting request message.

In an optional implementation manner of the present invention, if in step 101, the user equipment adds the digital signature to the virtual machine starting request message according to the key that is set using the instruction of the authorized user, and then encrypts the virtual machine starting request message using the public key of the third-party trusted platform, the security control platform also needs to invoke a decryption function of the third-party trusted platform to decrypt the virtual machine starting request message, in other words, to decrypt the virtual machine starting request message using the public key (for example, a root key) of the third-party trusted platform. Further, for example, digital signature information of the authorized user is stored in advance on the security control platform, and the security control platform may determine, according to the digital signature information in the virtual machine starting request message, that the virtual machine starting request message is sent by the user equipment according to the instruction of the authorized user, which ensures that enabling of the virtual machine is secure and trustworthy. After the decryption, the security control platform obtains the user information and the identifier of the virtual machine that needs to be enabled, which are included in the virtual machine starting request message.

103: Perform authentication on the user information, and based on successful authentication, invoke the third-party trusted platform to decapsulate the virtual machine that needs to be enabled.

In an optional implementation manner of the present invention, to ensure that enabling of the virtual machine is secure and trustworthy, after obtaining the user information, the security control platform performs authentication on the information about the authorized user, to ensure that the virtual machine is enabled by the authorized user.

In an optional implementation manner of the present invention, to ensure security and trustworthiness of the virtual machine that needs to be enabled, the virtual machine that needs to be enabled is encrypted using an encapsulation key (or a root key) of the third-party trusted platform, and thereby it can be determined that the virtual machine that needs to be enabled is an absolutely private security container or trusted space for the user. Therefore, after obtaining the identifier of the virtual machine that needs to be enabled, the security control platform needs to invoke a decryption function of the third-party trusted platform to decapsulate the virtual machine corresponding to the identifier of the virtual machine, in other words, to decapsulate the virtual machine using the encapsulation key provided by the third-party trusted platform for the virtual machine that needs to be enabled or the root key of the third-party trusted platform.

In an optional implementation manner of the present invention, in the foregoing step 101, if the virtual machine starting request message further includes an encapsulation key for the virtual machine that needs to be enabled, after successfully authenticating the user information, the security control platform directly decapsulates, using the encapsulation key included in the virtual machine starting request message, the virtual machine that needs to be enabled.

In an optional implementation manner of the present invention, to ensure security and trustworthiness of the virtual machine, after decapsulating the virtual machine that needs to be enabled, the security control platform may invoke the third-party trusted platform to perform an integrity check on the decapsulated virtual machine, for example, to check at least one of an operating system, a registry, a system directory, and a login log of the virtual machine. If an integrity check value of the current check is inconsistent with an integrity check value, of the virtual machine, stored on the security control platform, it indicates that an operating environment of the virtual machine has changed. To ensure the security and trustworthiness of the virtual machine, the security control platform may restrict enabling of the virtual machine, for example, restricting access to critical data by the virtual machine and sending permission of the virtual machine, and may further prompt the user equipment with information such as entering a recovery password or contacting a service provider for handling. If the integrity check value is consistent with the integrity check value, of the virtual machine, stored on the security control platform, it indicates that the operating environment of the virtual machine does not change and the virtual machine is secure and trustworthy, and the virtual machine is enabled.

In this embodiment of the present invention, when receiving a virtual machine enabling request message that is encrypted using a key of a third-party trusted platform, is from user equipment, and is forwarded by a management platform, a security control platform first invokes a decryption function of the third-party trusted platform to decrypt the virtual machine enabling request message, obtains user information and an identifier of a virtual machine that needs to be enabled, which are included in the virtual machine enabling request message, further performs authentication on the user information, and then after successful authentication, invokes the decryption function of the third-party trusted platform again to decapsulate the virtual machine that needs to be enabled, thereby ensuring that other user equipment (including the management platform) can neither obtain the key, of the third-party trusted platform, for encrypting the virtual machine enabling request message, nor obtain an encapsulation key, of the third-party trusted platform, for performing encapsulation and encryption on the virtual machine. That is, a virtual machine of an authorized user can be enabled only by the authorized user, which enhances security of management control on the virtual machine, and thereby also enhances security of a cloud computing platform.

Figure 3:
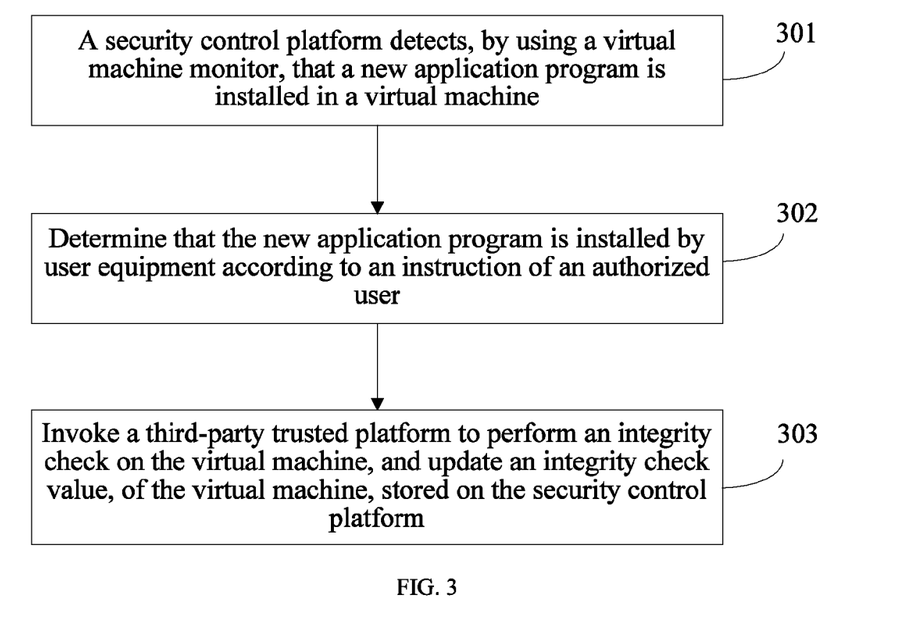
FIG. 3 is a schematic flowchart of a management control method for a virtual machine according to another embodiment of the present invention.

FIG. 3 is a schematic flowchart of a management control method for a virtual machine according to another embodiment of the present invention; this method is a further extension based on the method embodiment shown in FIG. 1 and the application system shown in FIG. 2. After the authorized user enables the virtual machine of the authorized user using the user equipment, if the operating environment changes during running of the virtual machine, for example, a new application program is installed in the virtual machine, to implement secure running of the virtual machine, the security control platform may invoke a third-party trusted platform to perform an integrity check on the virtual machine, and a specific implementation process is shown in FIG. 3, including:

301: The security control platform detects, using a virtual machine monitor, that a new application program is installed in the virtual machine.

After the authorized user enables the virtual machine of the authorized user using the user equipment, the new application program is installed in the virtual machine during running of the virtual machine. As shown in FIG. 2, the virtual machine monitor can detect that the new application program is installed in the virtual machine, and obtain an identifier of the newly installed application program, and the virtual machine monitor informs the security control platform of the identifier of the newly installed application program.

302: Determine that the new application program is installed by the user equipment according to an instruction of the authorized user.

303: Invoke the third-party trusted platform to perform an integrity check on the virtual machine, and update an integrity check value, of the virtual machine, stored on the security control platform.

In an optional implementation manner of the present invention, the user equipment may preset, on the security control platform and according to an instruction of the authorized user, a security control policy table of a protected virtual machine of the user. Table 1 is a security control policy table applied in this embodiment of the present invention. It should be noted that, in an actual application, security control policy tables of multiple protected virtual machines exist on the security control platform. As shown in Table 1, an identifier of a virtual machine is used to represent a security control policy table entry of the corresponding virtual machine in the security control policy table. For example, identifiers of application programs whose installation in a virtual machine 1 is authorized in advance, such as an identifier of an application program 1 and an identifier of an application program 2, are added to a security control policy table corresponding to the virtual machine.

| Security control policy table | |
|---|---|
| Identifier of virtual machine 1 | Identifier of application program 1 |
|  | Identifier of application program 2 |
| Identifier of virtual machine 2 | Identifier of application program 3 |
|  | Identifier of application program 4 |
| Identifier of virtual machine 3 | Identifier of application program 5 |
|  | Identifier of application program 6 |

When detecting, using the virtual machine monitor, that the new application program is installed in the virtual machine, the security control platform queries the security control policy table corresponding to the virtual machine according to the identifier of the newly installed application program. If it is determined that the security control policy table corresponding to the virtual machine includes the identifier of the newly installed application program, the security control platform determines that the new application program is installed by the user equipment according to the instruction of the authorized user, invokes the third-party trusted platform to perform an integrity check on the virtual machine, and updates the integrity check value, of the virtual machine, stored on the security control platform with an integrity check value of the current check.

In an optional implementation manner of the present invention, after the authorized user enables the virtual machine of the authorized user using the user equipment, the authorized user may install the new application program in the virtual machine of the authorized user using the user equipment during running of the virtual machine. In a specific implementation, the user equipment may send, according to the instruction of the authorized user, a request for installing the new application program to the security control platform using the management platform.

For example, to ensure that the new application program is installed by the user equipment according to the instruction of the authorized user, the foregoing request for installing the new application program is encrypted using a key of the third-party trusted platform, where the key of the third-party trusted platform may be a private USB Key or a smart card provided by the third-party trusted platform for the user equipment. Only the user can use the private key to encrypt the request for installing the new application program, and neither the management platform nor other users can use the key.

The security control platform invokes a decryption function of the third-party trusted platform to decrypt the request for installing the new application program, in other words, to decrypt the request for installing the new application program using the key provided by the third-party trusted platform for the user. Then, the security control platform determines that the new application program is installed by the user equipment according to the instruction of the authorized user, invokes the third-party trusted platform to perform an integrity check on the virtual machine, and updates the integrity check value, of the virtual machine, stored on the security control platform with the integrity check value of the current check.

For another example, to ensure that the new application program is installed by the user equipment according to the instruction of the authorized user, the user equipment may sign, according to a key that is set using an instruction of the authorized user, the request for installing the new application program, and then encrypt, using a public key of the third-party trusted platform, the request for installing the new application program.

The security control platform also needs to invoke the decryption function of the third-party trusted platform to decrypt the request for installing the new application program, in other words, to decrypt the request for installing the new application program using the public key (for example, a root key) of the third-party trusted platform. Further, for example, digital signature information of the authorized user is stored in advance on the security control platform, and the security control platform may determine, according to digital signature information in the request for installing the new application program, that the request for installing the new application program is sent by the user equipment according to the instruction of the authorized user, which ensures that the installation of the new application program is secure and trustworthy.

For another example, the request for installing the new application program, which is sent by the user equipment to the security control platform using the management platform, is not encrypted; to ensure that the new application program is installed by the user equipment according to the instruction of the authorized user, the security control platform may invoke an encryption function of the third-party trusted platform to generate a piece of data encrypted using a key of the third-party trusted platform. The security control platform sends the encrypted data to the user equipment using the management platform. The user equipment decrypts the encrypted data using a private key (for example, a USB Key or a smart card) provided by the third-party trusted platform for the user, and sends decrypted data to the security control platform. The security control platform makes a comparison and determines whether the decrypted data is the same as the encrypted data, and if the decrypted data is the same as the encrypted data, determines that the request for installing the new application program is started by the authorized user. The private USB Key or the smart card can be used only by the authorized user, and neither the management platform nor other users can obtain the private USB Key or the smart card of the authorized user, which ensures that the installation of the new application program is secure and trustworthy.

In an optional implementation manner of the present invention, after the virtual machine is enabled, the authorized user of the virtual machine may initiate, using the user equipment at any time, an integrity check on the virtual machine during running of the virtual machine. Specifically, the user equipment sends a virtual machine integrity check request message to the management platform, where the virtual machine integrity check request message includes an identifier of a virtual machine that requires an integrity check; the management platform forwards the virtual machine integrity check request message to the security control platform, and after receiving the virtual machine integrity check request message sent by the management platform, the security control platform may invoke the third-party trusted platform to perform an integrity check on the virtual machine; an integrity check value of the current check is compared with the integrity check value, of the virtual machine, stored on the security control platform; further, after the comparison, if it is found that the integrity check value of the virtual machine changes, it is found according to a log that an unauthorized application program is newly installed. The security control platform feeds back an integrity check value comparison result to the user equipment using the management platform so that the user equipment uninstalls the unauthorized application program according to the integrity check value comparison result or restores the virtual machine using a system restoration operation.

In this embodiment, if an unauthorized application program, for example, malware, is installed in a virtual machine, a security control platform neither performs an integrity check on the virtual machine, nor refreshes an integrity check value of the virtual machine; therefore, even if unauthorized malware is installed in the virtual machine, the security control platform can restrict access to critical data by the virtual machine in which the malware is installed and sending permission of the virtual machine because the newly installed malware will not pass the integrity check performed by the security control platform. Therefore, for any virtual machine in which an unauthorized application program (including malware) is installed, the security control platform can restrict access to critical data by the virtual machine and sending permission of the virtual machine, which solves a problem that a malware prevention technology can prevent only malware and Trojan horses that can be identified by security software and a false negative may occur.

In this embodiment of the present invention, when a security control platform detects that a new application program is installed in a virtual machine, if it is determined that a security control policy table corresponding to the virtual machine includes an identifier of the new application program, the security control platform invokes a third-party trusted platform to perform an integrity check on the virtual machine, and updates an integrity check value, of the virtual machine, stored on the security control platform. It can be implemented that no integrity check is performed on the virtual machine when an application program newly installed in the virtual machine is not an application program in the preset security control policy table. Therefore, it can be ensured that only an application program whose installation is authorized by a user can be installed and run in the virtual machine; otherwise, the integrity check performed by the security control platform will not be passed. The security control platform can restrict access to critical data by the virtual machine and sending permission of the virtual machine. Therefore, running security of a protected user virtual machine can be ensured, security of management control on the virtual machine is enhanced, and thereby security of a cloud computing platform is also enhanced.

Figure 4:
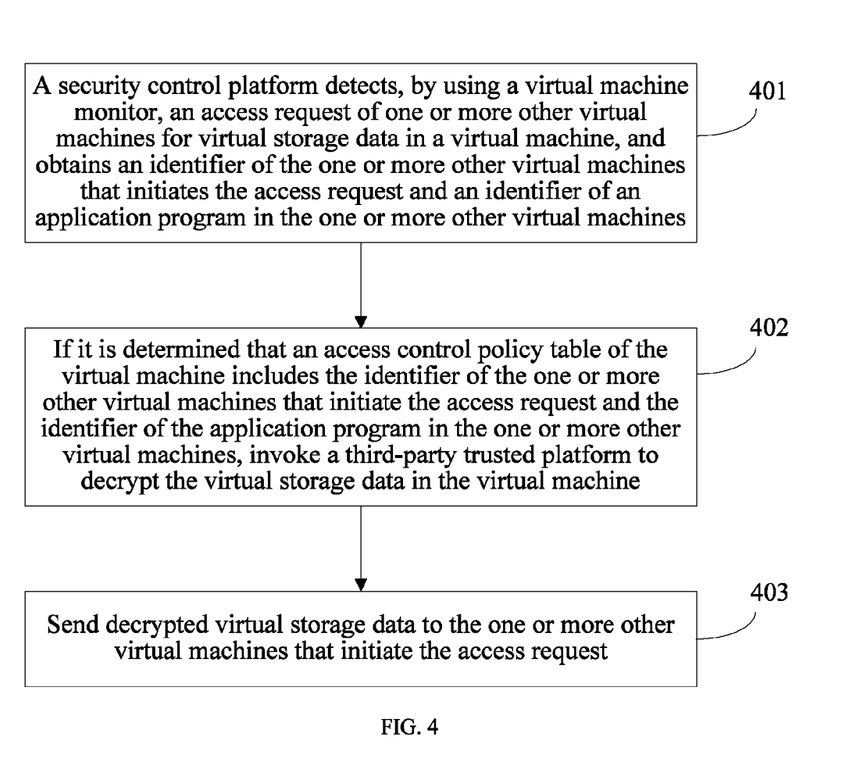
FIG. 4 is a schematic flowchart of a management control method for a virtual machine according to another embodiment of the present invention.

FIG. 4 is a schematic flowchart of a management control method for a virtual machine according to another embodiment of the present invention; this method is a further extension based on the method embodiment shown in FIG. 1 and the application system shown in FIG. 2. After the authorized user enables the virtual machine of the authorized user using the user equipment, when an application program in one or more other virtual machines requests to access data in virtual storage of the virtual machine during running of the virtual machine, to ensure security of the data in the virtual storage of the virtual machine of the authorized user, the security control platform verifies authorization of the one or more other virtual machines and the application program of the one or more other virtual machines, and the security control platform invokes the third-party trusted platform to decrypt the data in the virtual storage of the virtual machine only after the verification succeeds. A specific implementation process is shown in FIG. 4, including:

401: The security control platform detects, using a virtual machine monitor, an access request of one or more other virtual machines for virtual storage data in the virtual machine, and obtains an identifier of the one or more other virtual machines that initiate the access request and an identifier of an application program in the one or more other virtual machines.

As shown in FIG. 2, after the authorized user enables the virtual machine of the authorized user using the user equipment, when the one or more other virtual machines requests to access the data in the virtual storage of the virtual machine of the authorized user during running of the virtual machine, the virtual machine monitor obtains, by tracing an information flow in the virtual machine, the identifier of the one or more other virtual machines that initiate the access request. It should be noted that, in an actual application, the access request is generally initiated by an application program in the one or more other virtual machines, and therefore, the virtual machine monitor may further obtain, by tracing the information flow in the virtual machine, an identifier of the application program in the one or more other virtual machines that initiate the access request. The virtual machine monitor sends the identifier of the one or more other virtual machines and the identifier of the application program in the one or more other virtual machines that are obtained to the security control platform.

402: If it is determined that an access control policy table of the virtual machine includes the identifier of the one or more other virtual machines that initiate the access request and the identifier of the application program in the one or more other virtual machines, invoke the third-party trusted platform to decrypt the virtual storage data in the virtual machine.

In an implementation manner of the present invention, the user equipment may preset, on the security control platform and according to an instruction of the authorized user, an access control policy table of a protected virtual machine of the user. Table 2 is an access control policy table applied in this embodiment of the present invention. It should be noted that, in an actual application, access control policy tables of multiple protected virtual machines exist on the security control platform. As shown in Table 2, an identifier of a virtual machine is used to represent an access control policy table entry of the corresponding virtual machine in the access control policy table. For example, the access control policy table stores access control policy table entries corresponding to a virtual machine 1 and a virtual machine 2. For example, identifiers of another virtual machine 3 and another virtual machine 4 whose access to the virtual machine 1 is authorized in advance, an identifier of an application program 1 and an identifier of an application program 2 that are in the another virtual machine 3, and an identifier of an application program 3 and an identifier of an application program 4 that are in the another virtual machine 4 are added to an access control policy table entry corresponding to the virtual machine

| Access control policy table entry | | |
|---|---|---|
| Identifier of virtual machine 1 | Identifier of another virtual machine 3 | Identifier of application program 1<br>Identifier of application program 2 |
| | Identifier of another virtual machine 4 | Identifier of application program 3<br>Identifier of application program 4 |
| Identifier of virtual machine 2 | Identifier of another virtual machine 5 | Identifier of application program 5 |
| | Identifier of another virtual machine 6 | Identifier of application program 6<br>Identifier of application program 7 |

The security control platform queries, according to the identifier of the one or more other virtual machines that initiate the access request and the identifier of the application program in the one or more other virtual machines, the access control policy table corresponding to the virtual machine. If it is determined that the access control policy table corresponding to the virtual machine includes the identifier of the one or more other virtual machines that initiate the access request and the identifier of the application program in the one or more other virtual machines, the security control platform determines that the one or more other virtual machines that initiate the access request and the application program in the one or more other virtual machines are authorized in advance, and invokes the third-party trusted platform to decrypt the virtual storage data in the virtual machine.

In an implementation manner of the present invention, to ensure security of the virtual storage data in the virtual machine, the virtual storage data in the virtual machine is encrypted using an encapsulation key of the third-party trusted platform, which thereby can ensure that space in the virtual machine for storing the virtual storage data is an absolutely private secure container and space for the user. Therefore, after successfully verifying the authorization of the virtual machine that initiates the access request and the application program of the virtual machine, the security control platform invokes the third-party trusted platform to decapsulate the virtual storage data in the virtual machine, in other words, to decapsulate the virtual storage data in the virtual machine using the encapsulation key that is used in key-based encapsulation performed by the third-party trusted platform on the virtual storage data in the virtual machine or a root key of the third-party trusted platform.

403: Send decrypted virtual storage data to the one or more other virtual machines that initiate the access request.

In an implementation manner of the present invention, the security control platform queries, according to the identifier of the one or more other virtual machines that initiate the access request and the identifier of the application program in the one or more other virtual machines that are obtained, the access control policy table corresponding to the virtual machine. If it is determined that the access control policy table of the virtual machine does not include the obtained identifier of the one or more other virtual machines, or includes the obtained identifier of the one or more other virtual machines but does not include the obtained identifier of the application program, the security control platform determines that the access request is unauthorized, and the security control platform forbids the one or more other virtual machines from accessing the virtual storage data in the virtual machine, or sends only virtual storage data that is not decrypted to the virtual machine that initiates the access request.

The foregoing virtual storage data in the virtual machine includes data stored in a virtual memory of the virtual machine and memory data in the virtual machine.

In this embodiment of the present invention, when a security control platform detects an access request of one or more other virtual machines and an application program of the one or more other virtual machines for virtual storage data in a protected user virtual machine, if it is determined that an access control policy table corresponding to the user virtual machine includes an identifier of the one or more other virtual machines that initiate the access request and an identifier of the application program of the one or more other virtual machines, the security control platform invokes a third-party trusted platform to decrypt the virtual storage data in the user virtual machine, and sends decrypted data to the one or more other virtual machines that initiate the access request. Therefore, it is ensured that other user equipment (including a management platform) cannot obtain an encapsulation key, of the third-party trusted platform, for performing encapsulation and encryption on the virtual storage data in the user virtual machine. That is, only a virtual machine or an application program that is authorized by a user can access the virtual storage data in the user virtual machine; the security control platform may restrict access to the virtual storage data in the user virtual machine by one or more other virtual machines and an application program that are not authorized by the user, which ensures security of the virtual storage data in the protected user virtual machine, enhances security of management control on the virtual machine, and thereby also enhances security of a cloud computing platform.

In addition, the security control platform in this embodiment supports all operating systems or applications, applies to an application scenario of multiple tenants in a cloud, and can effectively control data transmission leakage between virtual machines.

Figure 5:
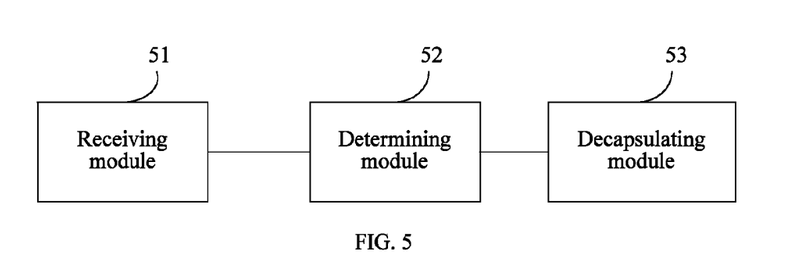
FIG. 5 is a schematic structural diagram of a security control platform according to another embodiment of the present invention.

FIG. 5 is a schematic structural diagram of a security control platform according to another embodiment of the present invention; as shown in FIG. 5, the security control platform includes a receiving module 51, configured to receive a virtual machine starting request message that is from user equipment and forwarded by a management platform, where the virtual machine starting request message includes an identifier of a virtual machine that needs to be enabled and user information; a determining module 52, configured to, on the basis that the receiving module receives the virtual machine starting request message that is from the user equipment, invoke a third-party trusted platform to determine that the virtual machine starting request message is initiated by the user equipment according to an instruction of an authorized user; and a decapsulating module 53, configured to, on the basis that the determining module determines that the virtual machine starting request message is initiated by the user equipment according to the instruction of the authorized user, after the user information is authenticated successfully, invoke the third-party trusted platform to decapsulate the virtual machine that needs to be enabled.

In an implementation manner of the present invention, the determining module 52 is configured to, if it is determined that the virtual machine starting request message is encrypted using a key provided by the third-party trusted platform for the authorized user, determine that the virtual machine starting request message is initiated by the user equipment according to the instruction of the authorized user, and invoke the key provided by the third-party trusted platform for the authorized user, to decrypt the virtual machine starting request message.

In an implementation manner of the present invention, the determining module 52 is configured to, if it is determined that the virtual machine starting request message is encrypted using a public key of the third-party trusted platform, invoke the public key of the third-party trusted platform to decrypt the virtual machine starting request message; and obtain digital signature information of the virtual machine starting request message, and if it is determined that the obtained digital signature information is consistent with digital signature information of the authorized user stored in advance on the security control platform, determine that the virtual machine starting request message is initiated by the user equipment according to the instruction of the authorized user.

In an implementation manner of the present invention, the determining module 52 is configured to invoke the third-party trusted platform to generate data encrypted using a key of the third-party trusted platform; send the encrypted data to the user equipment using the management platform so that the user equipment decrypts the encrypted data using a private key provided by the third-party trusted platform for the authorized user, and returns decrypted data to the security control platform; and if it is determined that the decrypted data is the same as the encrypted data, determine that the virtual machine starting request message is initiated by the user equipment according to the instruction of the authorized user.

Figure 6:
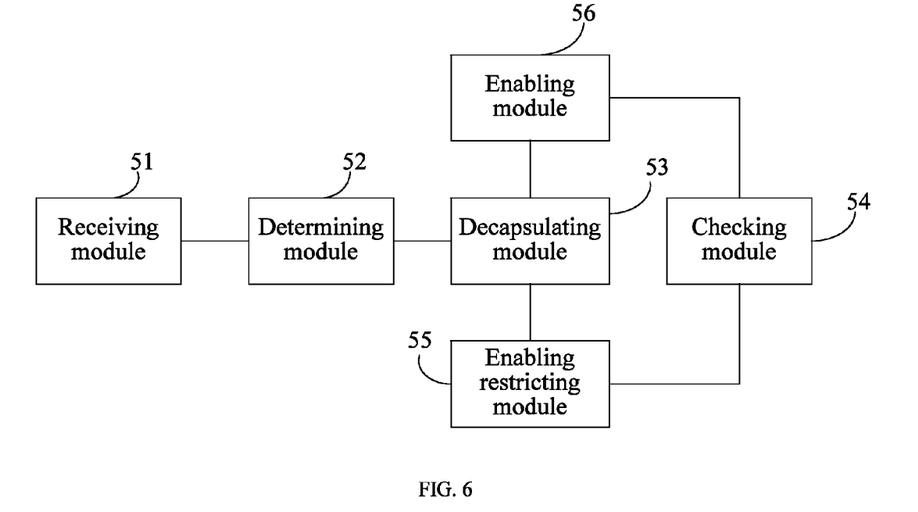
FIG. 6 is another schematic structural diagram of the security control platform according to the embodiment shown in FIG. 5.

FIG. 6 is another schematic structural diagram of the security control platform according to the embodiment shown in FIG. 5; as shown in FIG. 6, the security control platform further includes a checking module 54, configured to invoke the third-party trusted platform to perform an integrity check on the virtual machine; an enabling restricting module 55, configured to, on the basis that the checking module performs an integrity check on the virtual machine, if an integrity check value is inconsistent with an integrity check value, of the virtual machine, stored on the security control platform, restrict enabling of the decapsulating module to decapsulate the virtual machine that needs to be enabled; and an enabling module 56, configured to, on the basis that the checking module performs an integrity check on the virtual machine, if an integrity check value is consistent with the integrity check value, of the virtual machine, stored on the security control platform, enable the decapsulating module to decapsulate the virtual machine that needs to be enabled.

Figure 7:
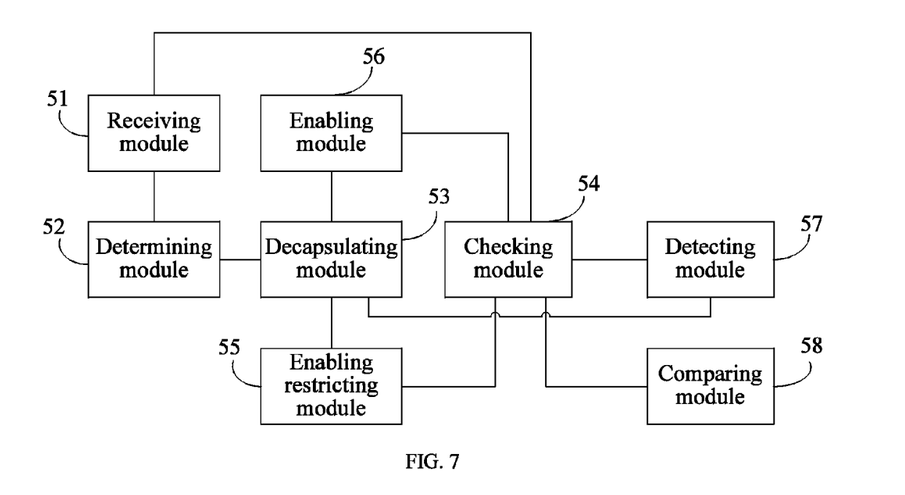
FIG. 7 is another schematic structural diagram of the security control platform according to the embodiment shown in FIG. 5.

FIG. 7 is another schematic structural diagram of the security control platform according to the embodiment shown in FIG. 5; as shown in FIG. 7, the security control platform further includes a monitoring module 57 configured to detect, using a virtual machine monitor, that a new application program is installed in the virtual machine.

In an implementation manner of the present invention, the checking module 54 is further configured to, on the basis that the monitoring module detects that the new application program is installed in the virtual machine, if it is determined that the new application program is installed by the user equipment according to an instruction of the authorized user, invoke the third-party trusted platform to perform an integrity check on the virtual machine, and update an integrity check value, of the virtual machine, stored on the security control platform.

In an implementation manner of the present invention, the receiving module 51 is further configured to receive a virtual machine integrity check request message sent by the management platform, where the virtual machine integrity check request message is sent by the user equipment to the management platform, and the virtual machine integrity check request message includes an identifier of a virtual machine that requires an integrity check.

In an implementation manner of the present invention, the checking module 54 is further configured to, based on the virtual machine integrity check request message received by the receiving module, invoke the third-party trusted platform to perform an integrity check on the virtual machine.

In an implementation manner of the present invention, the security control platform further includes a comparing module 58, configured to, on the basis that the checking module performs an integrity check on the virtual machine, compare an integrity check value with an integrity check value, of the virtual machine, stored on the security control platform; and send an integrity check value comparison result to the management platform so that the management platform sends the integrity check value comparison result to the user equipment.

In an implementation manner of the present invention, the monitoring module 57 is further configured to detect, using a virtual machine monitor, an access request of one or more other virtual machines for virtual storage data in the virtual machine, and obtain an identifier of the one or more other virtual machines that initiate the access request and an identifier of an application program; and the decapsulating module 53 is further configured to, on the basis that the monitoring module detects the access request of the one or more other virtual machines for the virtual storage data in the virtual machine, if it is determined that an access control policy table entry of the virtual machine includes the identifier of the one or more other virtual machines and the identifier of the application program that are obtained, invoke the third-party trusted platform to decrypt the virtual storage data in the virtual machine; and send decrypted virtual storage data to the one or more other virtual machines that initiate the access request.

In an implementation manner of the present invention, if the foregoing virtual machine starting request message further includes an encapsulation key for the virtual machine that needs to be enabled, the decapsulating module 53 is further configured to, based on the virtual machine starting request message received by the receiving module, decapsulate the virtual machine corresponding to the identifier of the virtual machine using the encapsulation key included in the virtual machine starting request message.

The security control platform includes a TSD, and the third-party trusted platform includes a TPM and a TCM.

The foregoing virtual storage data in the virtual machine includes data stored in a virtual memory of the virtual machine and memory data in the virtual machine.

In this embodiment of the present invention, when a security control platform detects an access request of one or more other virtual machines and an application program of the one or more other virtual machines for virtual storage data in a protected user virtual machine, if it is determined that an access control policy table corresponding to the user virtual machine includes an identifier of the one or more other virtual machines that initiate the access request and an identifier of the application program of the one or more other virtual machines, the security control platform invokes a third-party trusted platform to decrypt the virtual storage data in the user virtual machine, and sends decrypted data to the one or more other virtual machines that initiate the access request. Therefore, it is ensured that other user equipment (including a management platform) cannot obtain an encapsulation key, of the third-party trusted platform, for performing encapsulation and encryption on the virtual storage data in the user virtual machine. That is, only a virtual machine or an application program that is authorized by a user can access the virtual storage data in the user virtual machine; the security control platform may restrict access to the virtual storage data in the user virtual machine by one or more other virtual machines and an application program that are not authorized by the user, which ensures security of the virtual storage data in the protected user virtual machine, enhances security of management control on the virtual machine, and thereby also enhances security of a cloud computing platform.

In addition, the security control platform in this embodiment supports all operating systems or applications, applies to an application scenario of multiple tenants in a cloud, and can effectively control data transmission leakage between virtual machines.

Another embodiment of the present invention further provides a security control platform, including a processor, where the processor performs the following steps during running: receiving a virtual machine starting request message that is from user equipment and forwarded by a management platform, where the virtual machine starting request message includes an identifier of a virtual machine that needs to be enabled and user information; invoking a third-party trusted platform to determine that the virtual machine starting request message is initiated by the user equipment according to an instruction of an authorized user; and after the user information is authenticated successfully, invoking the third-party trusted platform to decapsulate the virtual machine that needs to be enabled.

In a first possible implementation manner, the processor further performs the following steps: if it is determined that the virtual machine starting request message is encrypted using a key provided by the third-party trusted platform for the authorized user, determining that the virtual machine starting request message is initiated by the user equipment according to the instruction of the authorized user, and invoking the key provided by the third-party trusted platform for the authorized user, to decrypt the virtual machine starting request message.

In a second possible implementation manner, the processor further performs the following steps: if it is determined that the virtual machine starting request message is encrypted using a public key of the third-party trusted platform, invoking the public key of the third-party trusted platform to decrypt the virtual machine starting request message; and obtaining digital signature information of the virtual machine starting request message, and if it is determined that the obtained digital signature information is consistent with digital signature information of the authorized user stored in advance on the security control platform, determining that the virtual machine starting request message is initiated by the user equipment according to the instruction of the authorized user.

In a third possible implementation manner, the processor further performs the following steps: invoking the third-party trusted platform to generate data encrypted using a key of the third-party trusted platform; sending the encrypted data to the user equipment using the management platform so that the user equipment decrypts the encrypted data using a private key provided by the third-party trusted platform for the authorized user, and returns decrypted data to the security control platform; and if it is determined that the decrypted data is the same as the encrypted data, determining that the virtual machine starting request message is initiated by the user equipment according to the instruction of the authorized user.

Based on the first, second, and third possible implementation manners, in a fourth possible implementation manner, the processor further performs the following steps: invoking the third-party trusted platform to perform an integrity check on the virtual machine; and if an integrity check value is inconsistent with an integrity check value, of the virtual machine, stored on the security control platform, restricting enabling of the virtual machine; or if an integrity check value is consistent with an integrity check value, of the virtual machine, stored on the security control platform, enabling the virtual machine.

Based on the first, second, and third possible implementation manners, in a fifth possible implementation manner, the processor further performs the following steps: detecting, using a virtual machine monitor, that a new application program is installed in the virtual machine, and obtaining an identifier of the new application program; and if it is determined that the new application program is installed by the user equipment according to an instruction of the authorized user, invoking the third-party trusted platform to perform an integrity check on the virtual machine, and updating an integrity check value, of the virtual machine, stored on the security control platform.

Based on the first, second, and third possible implementation manners, in a sixth possible implementation manner, the processor further performs the following steps: receiving a virtual machine integrity check request message sent by the management platform, where the virtual machine integrity check request message is sent by the user equipment to the management platform, and the virtual machine integrity check request message includes an identifier of a virtual machine that requires an integrity check; invoking the third-party trusted platform to perform an integrity check on the virtual machine; comparing an integrity check value with an integrity check value, of the virtual machine, stored on the security control platform; and sending an integrity check value comparison result to the management platform so that the management platform sends the integrity check value comparison result to the user equipment.

Based on the first, second, and third possible implementation manners, in a seventh possible implementation manner, the processor further performs the following steps: detecting, using a virtual machine monitor, an access request of one or more other virtual machines for virtual storage data in the virtual machine, and obtaining an identifier of the one or more other virtual machines that initiate the access request and an identifier of an application program; and if it is determined that an access control policy table entry of the virtual machine includes the identifier of the one or more other virtual machines and the identifier of the application program that are obtained, invoking the third-party trusted platform to decrypt the virtual storage data in the virtual machine; and sending decrypted virtual storage data to the one or more other virtual machines that initiate the access request.

In an eighth possible implementation manner, the virtual machine starting request message further includes an encapsulation key for the virtual machine that needs to be enabled; and the processor further performs the following step: decapsulating the virtual machine corresponding to the identifier of the virtual machine using the encapsulation key included in the virtual machine starting request message.

In this embodiment of the present invention, when a security control platform detects an access request of one or more other virtual machines and an application program of the one or more other virtual machines for virtual storage data in a protected user virtual machine, if it is determined that an access control policy table corresponding to the user virtual machine includes an identifier of the one or more other virtual machines that initiate the access request and an identifier of the application program of the one or more other virtual machines, the security control platform invokes a third-party trusted platform to decrypt the virtual storage data in the user virtual machine, and sends decrypted data to the one or more other virtual machines that initiate the access request. Therefore, it is ensured that other user equipment (including a management platform) cannot obtain an encapsulation key, of the third-party trusted platform, for performing encapsulation and encryption on the virtual storage data in the user virtual machine. That is, only a virtual machine or an application program that is authorized by a user can access the virtual storage data in the user virtual machine; the security control platform may restrict access to the virtual storage data in the user virtual machine by one or more other virtual machines and an application program that are not authorized by the user, which ensures security of the virtual storage data in the protected user virtual machine, enhances security of management control on the virtual machine, and thereby also enhances security of a cloud computing platform.

In addition to the processor, the security control platform further includes a memory, a communications interface, and a communications bus, where the processor is connected to the memory using the communications bus, and the security control platform communicates with another network element using the communications interface.

In addition, the security control platform in this embodiment supports all operating systems or applications, applies to an application scenario of multiple tenants in a cloud, and can effectively control data transmission leakage between virtual machines.

Another embodiment of the present invention further provides a management control system for a virtual machine, including the security control platform in the embodiment shown in any one of the foregoing FIG. 5 to FIG. 7. For detailed content of the security control platform, refer to related descriptions in the embodiment shown in any one of FIG. 5 to FIG. 7, and details are not described again.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

Finally, it should be noted that the foregoing embodiments are merely intended for describing the technical solutions of the present invention but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A management control method for a virtual machine, comprising:
   receiving, by a security control platform, a virtual machine starting request message that is from user equipment and forwarded by a management platform, wherein the virtual machine starting request message comprises an identifier of a virtual machine that needs to be enabled and user information;
   invoking a third-party trusted platform to determine that the virtual machine starting request message is initiated by the user equipment according to an instruction of an authorized user;
   performing authentication on the user information; and
   invoking, based on successful authentication, the third-party trusted platform to decapsulate the virtual machine that needs to be enabled, and, wherein invoking the third-party trusted platform to determine that the virtual machine starting request message is initiated by the user equipment according to the instruction of the authorized user comprises:
   invoking, by the security control platform, the third-party trusted platform to generate data encrypted using a key of the third-party trusted platform;
   sending the encrypted data to the user equipment using the management platform so that the user equipment decrypts the encrypted data using a private key provided by the third-party trusted platform for the authorized user, and returns decrypted data to the security control platform; and
   determining that the virtual machine starting request message is initiated by the user equipment according to the instruction of the authorized user when the decrypted data is the same as the data before the encryption.

2. The method according to claim 1, wherein after invoking the third-party trusted platform to decapsulate the virtual machine that needs to be enabled, the method further comprises:
   invoking, by the security control platform, the third-party trusted platform to perform an integrity check on the virtual machine;
   restricting enabling of the virtual machine when an integrity check value is inconsistent with an integrity check value of the virtual machine that is stored on the security control platform; and
   enabling the virtual machine when the integrity check value is consistent with the integrity check value of the virtual machine that is stored on the security control platform.

3. The method according to claim 1, wherein after invoking the third-party trusted platform to decapsulate the virtual machine that needs to be enabled, the method further comprises:
   detecting, by the security control platform using a virtual machine monitor, that a new application program is installed in the virtual machine;
   determining that the new application program is installed by the user equipment according to an instruction of the authorized user;
   invoking the third-party trusted platform to perform an integrity check on the virtual machine; and
   updating an integrity check value of the virtual machine that is stored on the security control platform.

4. The method according to claim 1, wherein after invoking the third-party trusted platform to decapsulate the virtual machine that needs to be enabled, the method further comprises:
   receiving, by the security control platform, a virtual machine integrity check request message sent by the management platform, wherein the virtual machine integrity check request message is sent by the user equipment to the management platform, and wherein the virtual machine integrity check request message comprises an identifier of the virtual machine that requires an integrity check;
   invoking the third-party trusted platform to perform an integrity check on the virtual machine;
   comparing an integrity check value with an integrity check value of the virtual machine that is stored on the security control platform; and
   sending an integrity check value comparison result to the management platform so that the management platform sends the integrity check value comparison result to the user equipment.

5. The method according to claim 1, wherein after invoking the third-party trusted platform to decapsulate the virtual machine that needs to be enabled, the method further comprises:
   detecting, by the security control platform using a virtual machine monitor, an access request of one or more other virtual machines for virtual storage data in the virtual machine;

obtaining an identifier of the one or more other virtual machines that initiate the access request and an identifier of an application program;

invoking the third-party trusted platform to decrypt the virtual storage data in the virtual machine when an access control policy table entry of the virtual machine comprises the identifier of the one or more other virtual machines and the identifier of the application program that are obtained; and sending decrypted virtual storage data to the one or more other virtual machines that initiate the access request.

6. The method according to claim 1, wherein the virtual machine starting request message further comprises an encapsulation key for the virtual machine that needs to be enabled, wherein after performing authentication on the user information, based on successful authentication, the method comprises decapsulating, by the security control platform, the virtual machine corresponding to the identifier of the virtual machine using the encapsulation key for the virtual machine that needs to be enabled, and wherein the encapsulation key is part of the virtual machine starting request message.

7. The method according to claim 1, wherein the security control platform comprises a trusted service domain (TSD), and wherein the third-party trusted platform comprises a trusted platform module (TPM) and a trusted cryptography module (TCM).

8. A security control platform, comprising:
a processor, wherein the processor is configured to perform the following steps when running:
receiving a virtual machine starting request message that is from user equipment and forwarded by a management platform, wherein the virtual machine starting request message comprises an identifier of a virtual machine that needs to be enabled and user information;
invoking a third-party trusted platform to determine that the virtual machine starting request message is initiated by the user equipment according to an instruction of an authorized user; and
invoking the third-party trusted platform to decapsulate the virtual machine that needs to be enabled after the user information is successfully authenticated, and, wherein invoking the third-party trusted platform to determine that the virtual machine starting request message is initiated by the user equipment according to the instruction of the authorized user comprises:
invoking, by the security control platform, the third-party trusted platform to generate data encrypted using a key of the third-party trusted platform;
sending the encrypted data to the user equipment using the management platform so that the user equipment decrypts the encrypted data using a private key provided by the third-party trusted platform for the authorized user, and returns decrypted data to the security control platform; and
determining that the virtual machine starting request message is initiated by the user equipment according to the instruction of the authorized user when the decrypted data is the same as the data before the encryption.

9. The security control platform according to claim 8, wherein the processor is further configured to perform the following steps:
invoking the third-party trusted platform to perform an integrity check on the virtual machine; and restricting enabling of the virtual machine when an integrity check value is inconsistent with an integrity check value of the virtual machine that is stored on the security control platform; and enabling the virtual machine when the integrity check value is consistent with the integrity check value of the virtual machine that is stored on the security control platform.

10. The security control platform according to claim 8, wherein the processor is further configured to perform the following steps:
detecting, using a virtual machine monitor, that a new application program is installed in the virtual machine;
invoking the third-party trusted platform to perform an integrity check on the virtual machine when the new application program is installed by the user equipment according to an instruction of the authorized user; and
updating an integrity check value, of the virtual machine, stored on the security control platform when the new application program is installed by the user equipment according to an instruction of the authorized user.

11. The security control platform according to claim 8, wherein the processor is further configured to perform the following steps:
receiving a virtual machine integrity check request message sent by the management platform, wherein the virtual machine integrity check request message is sent by the user equipment to the management platform, and wherein the virtual machine integrity check request message comprises an identifier of the virtual machine that requires an integrity check;
invoking the third-party trusted platform to perform an integrity check on the virtual machine;
comparing an integrity check value with an integrity check value, of the virtual machine, stored on the security control platform; and
sending an integrity check value comparison result to the management platform so that the management platform sends the integrity check value comparison result to the user equipment.

12. The security control platform according to claim 8, wherein the processor is further configured to perform the following steps:
detecting, using a virtual machine monitor, an access request of one or more other virtual machines for virtual storage data in the virtual machine;
obtaining an identifier of the one or more other virtual machines that initiate the access request and an identifier of an application program;
invoking the third-party trusted platform to decrypt the virtual storage data in the virtual machine when an access control policy table entry of the virtual machine comprises the identifier of the one or more other virtual machines and the identifier of the application program that are obtained; and
sending decrypted virtual storage data to the one or more other virtual machines that initiate the access request.

13. The security control platform according to claim 8, wherein the virtual machine starting request message further comprises an encapsulation key for the virtual machine that needs to be enabled, and wherein the processor is further configured to perform the following step decapsulating the virtual machine corresponding to the identifier of the virtual machine using the encapsulation key, which is comprised in the virtual machine starting request message, for the virtual machine that needs to be enabled.

\* \* \* \* \*